United States Patent
Partlow

(10) Patent No.: US 9,996,455 B2
(45) Date of Patent: *Jun. 12, 2018

(54) VIRTUAL STORAGE ADDRESS THRESHOLD FOR FREEMAINED FRAMES

(71) Applicant: International Business Machines Corporation, Armonk, NY (US)

(72) Inventor: Steven M. Partlow, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/963,638

(22) Filed: Dec. 9, 2015

(65) Prior Publication Data

US 2017/0168925 A1 Jun. 15, 2017

(51) Int. Cl.
*G06F 12/02* (2006.01)
*G06F 12/06* (2006.01)

(52) U.S. Cl.
CPC ........ *G06F 12/023* (2013.01); *G06F 12/0646* (2013.01); *G06F 2212/50* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 6,092,171 A | 7/2000 | Relph | |
| 7,464,249 B2 | 12/2008 | Hennessy et al. | |
| 8,838,928 B2 | 9/2014 | Robin et al. | |
| 2006/0004977 A1 | 1/2006 | Jann et al. | |
| 2010/0161934 A1 | 6/2010 | Alvarez et al. | |
| 2012/0054412 A1 | 3/2012 | Gainey, Jr. et al. | |
| 2012/0284477 A1 | 11/2012 | Gainey, Jr. et al. | |
| 2014/0052953 A1 | 2/2014 | Ben-tsion et al. | |
| 2014/0075142 A1 | 3/2014 | Horn et al. | |
| 2017/0090789 A1 | 3/2017 | Mari et al. | |
| 2017/0123725 A1 | 5/2017 | Miller, Jr. et al. | |

OTHER PUBLICATIONS

Campbell, John J., "DB2 for z/OS Virtual Storage Tuning", DB2 for z/OS Best Practices, © 2010 IBM Corporation, pp. 1-36, printed Dec. 8, 2015.
Tzortzatos, Elpida, "z/OS Basics: Virtual Storage Management (VSM) Overview", IBM Systems & Technology Group, © 2009 IBM Corporation, pp. 34 pages, printed Dec. 8, 2015.
Bryant, et al., "Virutal Memory", Chapter 9, second edition of Computer Systems: A Programmer's Perspective, pp. 741-755, printed Dec. 8, 2015.
U.S. Appl. No. 15/215,040 entitled "Virtual Storage Address Threshold for Freemained Frames", filed Jul. 20, 2016.
Appendix P.: List of IBM Patents or Patent Applications Treated as Related, 2 pages.

(Continued)

*Primary Examiner* — Daniel D Tsui
(74) *Attorney, Agent, or Firm* — Lance I. Hochhauser; Isaac J. Gooshaw

(57) ABSTRACT

Address-based thresholds for freemained frames are used to determine retention actions. Based, at least in part, on a comparison of a number of freemained frames for an address space against a threshold of freemained frames for the address space, freemained frames can be retained or rejected and/or the threshold can be adjusted.

20 Claims, 2 Drawing Sheets

(56) References Cited

OTHER PUBLICATIONS

Partlow, et al., "Virtual Storage Address Threshold for Freemained Frames", U.S. Appl. No. 15/292,583, filed Oct. 13, 2016, 24 pages.
IBM, Appendix P, List of IBM Patents or Patent Applications Treated as Related, 2 pages, dated Nov. 8, 2016.
List of IBM Patents or Patent Applications Treated as Related, Appendix P, Filed May 2, 2016, 2 pages.
Partlow, et al., "Virtual Storage Address Threshold for Freemained Frames", U.S. Appl. No. 15/143,699, filed May 2, 2016.

VIRTUAL STORAGE ADDRESS THRESHOLD FOR FREEMAINED FRAMES

BACKGROUND

The present invention relates generally to the field of electrical computers and digital processing systems, and more particularly to virtual memory addressing.

Virtual storage (sometimes also called virtual memory) can be allocated or deallocated. A frame backs a range of virtual storage. When a system releases virtual storage, a frame is either released or retained. If a frame is released, a system makes the frame available to back any virtual storage. Alternatively, a frame is retained to back virtual storage (sometimes also called mapping) and sensitive information from the frame is erased. A frame retained to back virtual storage is sometimes also called a freemained frame. A freemained frame is retained for an eventuality that a virtual storage range is reused. Freemained frames are retained to improve system performance. Historically, efforts have been made to minimize adverse system impacts. To do so, count thresholds are set for the number of freemained frames that are retained. Freemained frames are sometimes also described as page frames backing deallocated virtual storage.

SUMMARY

According to an aspect of the present invention, there is a method, computer program product, and/or system that performs the following operations (not necessarily in the following order): (i) receiving a request to add a first set of freemained frames to an address space; (ii) determining a number of freemained frames for the address space; (iii) determining a virtual storage address threshold for the address space; (iv) comparing the number of freemained frames to a freemained frame count target to generate a comparison; and (v) taking a retention action on the address space based, at least in part, on the comparison. At least determining the number of freemained frames for the address space is performed by computer software running on computer hardware.

DETAILED DESCRIPTION

Figure 1:
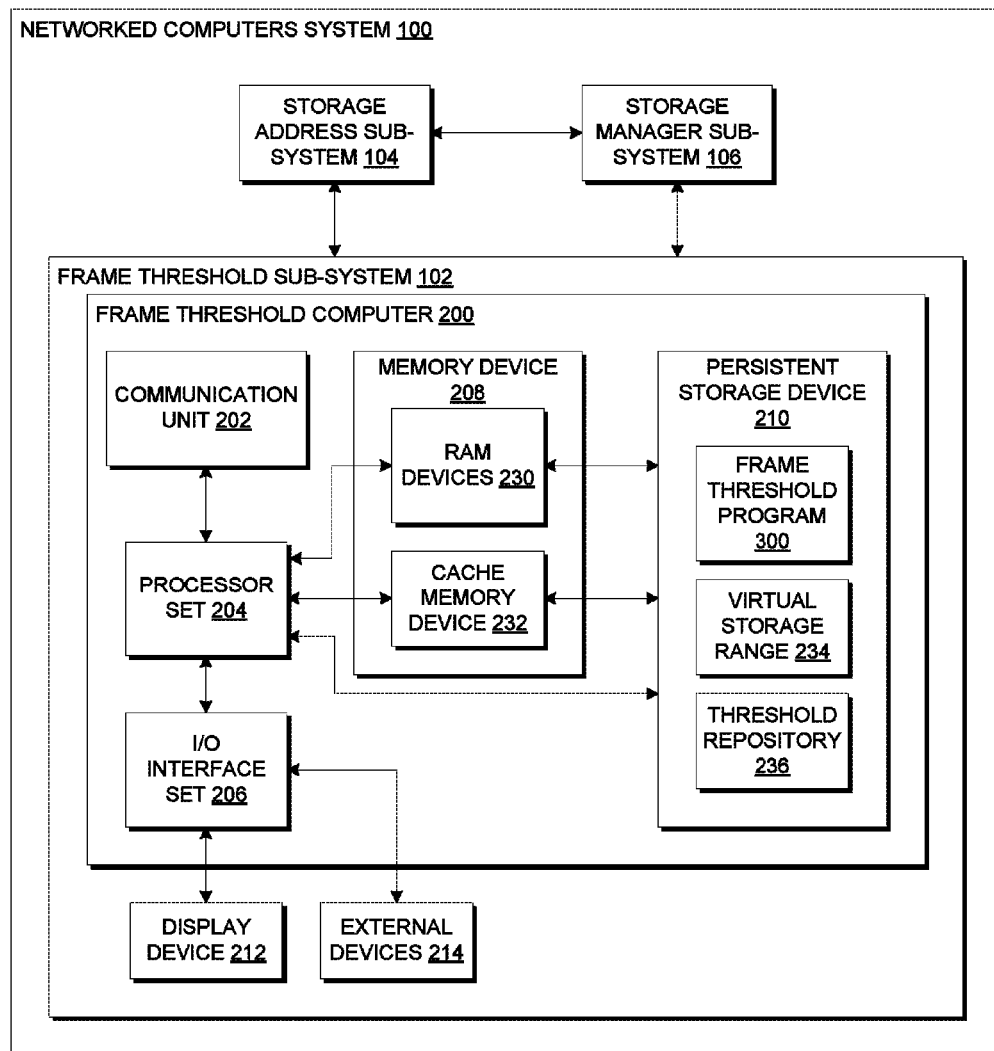
FIG. 1 is a block diagram view of a first embodiment of a system according to the present invention.

Address-based thresholds for freemained frames are used to determine retention actions. Based, at least in part, on a comparison of a number of freemained frames for an address space against a threshold of freemained frames for the address space, freemained frames can be retained or rejected and/or the threshold can be adjusted. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: frame threshold sub-system 102; storage address sub-system 104; and storage manager sub-system 106. Frame threshold sub-system 102 contains: frame threshold computer 200; display device 212; and external devices 214. Frame threshold computer 200 contains: communication unit 202; processor set 204; input/output (I/O) interface set 206; memory device 208; and persistent storage device 210. Memory device 208 contains: random access memory (RAM) devices 230; and cache memory device 232. Persistent storage device 210 contains: virtual storage range 234; threshold repository 236; and frame threshold program 300.

Frame threshold sub-system 102 is, in many respects, representative of the various computer sub-systems in the present invention. Accordingly, several portions of frame threshold sub-system 102 will now be discussed in the following paragraphs.

Frame threshold sub-system 102 may be a laptop computer, a tablet computer, a netbook computer, a personal computer (PC), a desktop computer, a personal digital assistant (PDA), a smart phone, or any programmable electronic device capable of communicating with other computer sub-systems. Frame threshold program 300 is a collection of machine readable instructions and/or data that is used to create, manage, and control certain software functions that will be discussed in detail, below, in the Example Embodiment sub-section of this Detailed Description section.

Frame threshold sub-system 102 is shown as a block diagram with many double arrows. These double arrows (no separate reference numerals) represent a communications fabric, which provides communications between various components of frame threshold sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for frame threshold sub-system 102; and/or (ii) devices external to frame threshold sub-system 102 may be able to provide memory for frame threshold sub-system 102.

Frame threshold program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Frame threshold program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to frame threshold sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with frame threshold computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., frame threshold program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
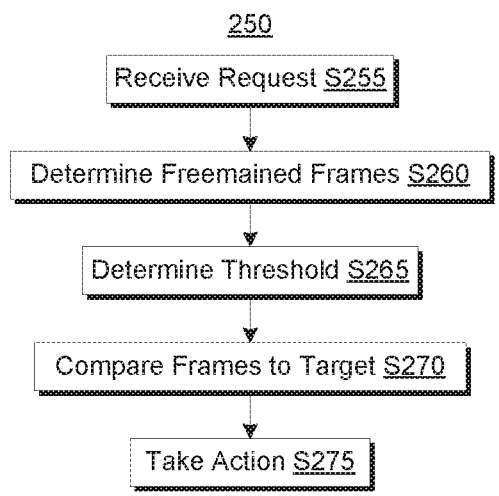
FIG. 2 is a flowchart showing a first embodiment method performed, at least in part, by the first embodiment system.
Figure 3:
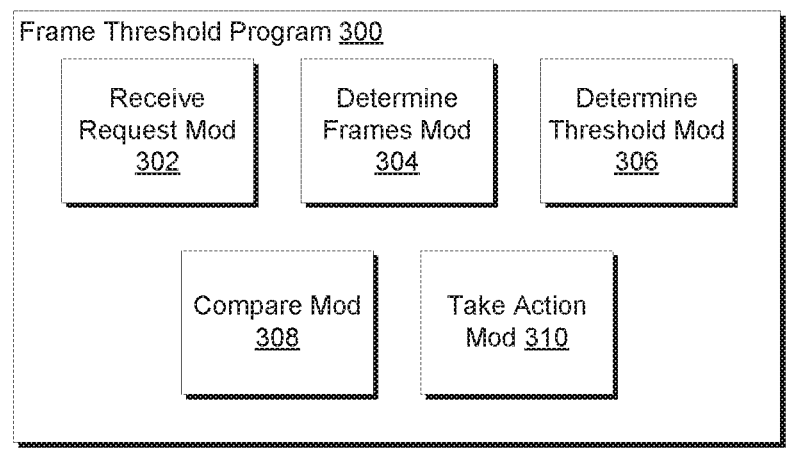
FIG. 3 is a block diagram view of a machine logic (e.g., software) portion of the first embodiment system.

FIG. 2 shows flowchart 250 depicting a method according to the present invention. FIG. 3 shows frame threshold program 300, which performs at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive request module ("mod") 302 receives a request to add a set of freemained frames to an address space. An address space is a set of ranges of virtual storage addresses ("VSAs"). In some embodiments of the present invention, VSAs are used for a specific purpose, application, and/or process. In this example, receive request mod 302 receives a request to add 50 freemained frames to a first address space. In some embodiments of the present invention, receive request mod 302 receives a plurality of requests for one address space. In some of those embodiments, receive request mod 302 combines a plurality of requests for one address space into a single request.

Processing proceeds to operation S260, where determine frames mod 304 determines a number of freemained frames for an address space. A number of freemained frames for an address space is sometimes also called a count of freemained frames for an address space. In this example, determine frames mod 304 counts a number of freemained frames for a first address space. Here, determine frames mod 304 determines the first address space has 800 freemained frames. In some embodiments of the present invention, determine frames mod 304 indexes a set of freemained frames.

Processing proceeds to operation S265, where determine threshold mod 306 determines a VSA threshold relating to a set of freemained frames for an address space. Various address spaces have varying VSA thresholds. A VSA threshold can be changed over time. In this example, determine threshold mod 306 determines a VSA threshold for an address space. In some embodiments of the present invention, determine threshold mod 306 uses a VSA threshold as an address barrier. For example, if determine threshold mod 306 determines a VSA threshold for an address space is address 850, freemained frames can be added to addresses at or below 850 but cannot be added to addresses above address 850. Alternatively, determine threshold mod 306 determines a VSA threshold based, at least in part, on a freemained frame count target and/or a number of freemained frames for an address space. In some embodiments of the present invention, determine threshold mod 306 receives an address space for which to determine a VSA threshold based, at least in part, on an input. Alternatively, determine threshold mod 306 receives an address space for which to determine a VSA threshold based, at least in part, on: (i) a time lapse from a previous analysis of the address space; (ii) a release of a range of virtual storage; (iii) a request to add a set of freemained frames; and/or (iv) a trigger. In this example, determine threshold mod 306 determines a VSA threshold for the first address space. Here, determine threshold mod 306 determines the VSA threshold for the first address space is 2000.

Processing proceeds to operation S270, where compare mod 308 compares a number of freemained frames for an address space to a count target. A count target is a desired number of freemained frames for an address space. In some embodiments of the present invention, compare mod 308 determines a count target for an address space. In other embodiments, compare mod 308 receives a count target for an address space as an input. Alternatively, compare mod 308 determines a count target based, at least in part, on a VSA threshold for an address space. In some embodiments of the present invention, compare mod 308 uses tier descriptors to describe a comparison of a number of freemained frames for an address space to a count target. In some other embodiments, compare mod 308 uses percentages to describe a comparison of a number of freemained frames for an address space to a count target. For example, compare mod 308 uses: (i) "below" to signify that a number of freemained frames is less than 90% of a count target; (ii) "okay" to signify that a number of freemained frames is at least 90% of a count target, but less than 150% of the count target; (iii) "high" to signify that a number of freemained frames is at least 150% of a count target, but less than 200% of the count target; and (iv) "full" to signify that a number of freemained frames is at least 200% of a count target. Alternatively, compare mod 308 uses a numerical value to describe a comparison of a number of freemained frames for an address space to a count target. In this example, compare mod 308 determines a count target is 1000; here, compare mod 308 compares the number of freemained frames determined in operation S260 against the count target. Here, compare mod 308 determines that the number of freemained frames (800) is 80% of the count target (1000), and therefore, compare mod 308 describes the comparison as "below."

Processing terminates at operation S275, where take action mod 310 takes a set of actions with respect to a number of freemained frames for an address space, a count target, and/or a VSA threshold. In some embodiments of the present invention, take action mod 310 takes one or more actions including, but not limited to: (i) increasing a VSA threshold; (ii) decreasing a VSA threshold; (iii) increasing a count target; (iv) decreasing a count target; (v) permitting a request to add a set of freemained frames for an address space; (vi) denying a request to add a set of freemained frames for an address space; and/or (vii) removing and/or deleting a set of freemained frames (sometimes also called scheduling an asynchronous thread). In this example, because compare mod 308 determined that the number of freemained frames for the first address space is "below" the count target, take action mod 310 permits the request to add 50 freemained frames for the first address space and increases the VSA threshold to 2050. Here, take action mod 310 does not adjust the count target, which remains at 1000; the number of freemained frames, therefore, has increased to 850.

III. Further Comments and/or Embodiments

Some embodiments of the present invention recognize the following facts, potential problems, and/or potential areas for improvement with respect to the current state of the art: (i) count-based thresholds for freemained frames do not take into account address locations of various freemained frames; and/or (ii) count-based thresholds for freemained frames do not take into account a likelihood of reuse of a freemained frame.

In some embodiments of the present invention, a frame threshold sub-system adjusts a VSA threshold (e.g., increases, decreases) by a step value. In some of these embodiments, a frame threshold sub-system predetermines a step value. In some embodiments, a step value is one-half of the absolute difference between a number of freemained frames for an address space and a VSA threshold. For example, the number of freemained frames is 1500; the VSA threshold is 2000; the count target is 1000; the step value is (1500–1000)/2=250 addresses; therefore, the VSA threshold becomes 2250 or 1750. Alternatively, a step value is one address.

In some embodiments of the present invention, a frame threshold sub-system takes an action based, at least in part, on a result of a comparison. For example, based, at least in part, on the result of a comparison, a frame threshold sub-system takes an action including, but limited to: (i) "below": permit request to add a set of freemained frames for an address space and increase a VSA threshold; (ii) "okay": permit request to add a set of freemained frames for an address space; (iii) "high": permit request to add a set of freemained frames for an address space and decrease a VSA threshold; and/or (iv) "full": deny request to add a set of freemained frames for an address space and decrease a VSA threshold.

Some embodiments of the present invention may include one, or more, of the following features, characteristics, and/or advantages: (i) translating a count-based threshold to an address-based threshold; (ii) using an address-based threshold to signal compression is needed; (iii) employing address-based thresholds to better interact with freemained frames; (iv) determining VSA thresholds set by a system resource manager; and/or (v) determining VSA thresholds set by a virtual storage manager.

Some embodiments of the present invention may include one, or more, of the following features, characteristics, and/or advantages: (i) reusing freemained frames with lower address spaces; (ii) determining a set of freemained frames to reuse based, at least in part, on an address; (iii) determining a set of freemained frames based, at least in part, on a lower relative address; (iv) ordering a set of freemained frames to disallow based, at least in part, on an address; (v) disallowing a set of freemained frames over a period of time based, at least in part, on an address space; and/or (vi) disallowing a set of freemained frames at a single time based, at least in part, on an address space.

Some embodiments of the present invention may include one, or more, of the following features, characteristics, and/or advantages: (i) maintaining a VSA threshold to restrict use of freemained frames at higher address values; (ii) maintaining a VSA threshold to restrict use of freemained frames at higher page address spaces at higher address values before freemained frames at lower address values; (iii) lowering a VSA threshold as a number of freemained frames exceeds a count target; (iv) dynamically lowering a VSA threshold as a number of freemained frames exceeds a count target; (v) raising a VSA threshold as a number of freemained frames falls below a count target; and/or (vi) dynamically raising a VSA threshold as a number of freemained frames falls below a count target.

Some embodiments of the present invention may include one, or more, of the following features, characteristics, and/or advantages: (i) determining a VSA threshold for a number of freemained frames based, at least on a system resource manager; (ii) determining a VSA threshold for a number of freemained frames for an address space based, at least in part, on a system resource manager; (iii) determining a VSA threshold for a number of freemained frames for an address space based, at least in part, on a target set by a system resource manager; (iv) determining a number of freemained frames to retain; (v) determining a number of freemained frames to retain based, at least in part, on a VSA threshold, after a count target is met; and/or (vi) determining a number of freemained frames to retain based, at least in part, on a VSA threshold, after a count target is met based, at least in part, on a memory manager (sometimes also called a real storage manager).

Some embodiments of the present invention may include one, or more, of the following features, characteristics, and/or advantages: (i) a set of freemained frames may exist beyond a VSA threshold; (ii) a set of freemained frames may exist at an address when a VSA threshold is decreased from above that address to below that address; and (iii) a number of freemained frames may be below a count target.

Some embodiments of the present invention may include one, or more, of the following features, characteristics, and/or advantages: (i) maintaining a count of a number of freemained frames in real time; (ii) determining a count of a number of freemained frames responsive to a request to add a set of freemained frames; (iii) dynamically updating a count of a number of freemained frames in real time; (iv) updating a count of a number of freemained frames responsive to a request to add a set of freemained frames; (v) allowing freemained frames up to a VSA threshold; (vi) initializing a VSA threshold at a maximum value (e.g., for 31-bit addressing a maximum value is "7FFFFFFFx"); and/or (vii) lowering a VSA threshold for freemained frames to a lowest value of the pages for an address space.

Some embodiments of the present invention may include one, or more, of the following features, characteristics, and/or advantages: (i) lowering a VSA threshold of freemained frames; (ii) scheduling an asynchronous thread (sometimes also called a service request block) to reduce a number of freemained frames; (iii) eliminating freemained frames; and/or (iv) eliminating freemained frames starting with a highest address space. In some embodiments, an asynchronous thread is scheduled to manipulate frames backing a set of highest address spaces first.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
   receiving a request to add a first set of freemained frames to an address space;
   determining a number of freemained frames for the address space;
   determining a virtual storage address threshold for the address space based, at least in part, on a freemained frame count target;
   comparing the number of freemained frames to the freemained frame count target to generate a comparison; and
   taking a retention action on the address space based, at least in part, on the comparison;
   wherein:
     at least determining the number of freemained frames for the address space is performed by computer software running on computer hardware.

2. The method of claim 1, wherein the retention action is selected from a group consisting of:
   increasing the virtual storage address threshold by a step value; and
   decreasing the virtual storage address threshold by the step value.

3. The method of claim 2, wherein the step value is one-half of an absolute difference between the number of freemained frames and the freemained frame count target.

4. The method of claim 1, wherein the retention action is selected from a group consisting of:
   permitting the request to add the first set of freemained frames to the address space; and
   denying the request to add the first set of freemained frames to the address space.

5. The method of claim 1, wherein comparing the number of freemained frames to the freemained frame count target includes:
   using a set of tier descriptors to describe the comparison of the number of freemained frames to the freemained frame count target.

6. The method of claim 5, wherein the set of tier descriptors includes: below; okay; high; and full.

7. The method of claim 1, wherein taking the retention action on the address space includes:
   deleting a second set of freemained frames for the address space based, at least in part, on the virtual storage address threshold.

8. A computer program product comprising:
   a computer readable storage medium having stored thereon:
     first instructions executable by a device to cause the device to receive a request to add a first set of freemained frames to an address space;
     second instructions executable by a device to cause the device to determine a number of freemained frames for the address space;
     third instructions executable by a device to cause the device to determine a virtual storage address threshold for the address space based, at least in part, on a freemained frame count target;
     fourth instructions executable by a device to cause the device to compare the number of freemained frames to the freemained frame count target to generate a comparison; and
     fifth instructions executable by a device to cause the device to take a retention action on the address space based, at least in part, on the comparison.

9. The computer program product of claim 8, wherein the retention action is selected from a group consisting of:
   sixth instructions executable by a device to cause the device to increase the virtual storage address threshold by a step value; and
   seventh instructions executable by a device to cause the device to decrease the virtual storage address threshold by the step value.

10. The computer program product of claim 9, wherein the step value is one-half of an absolute difference between the number of freemained frames and the freemained frame count target.

11. The computer program product of claim 8, wherein the retention action is selected from a group consisting of:
    sixth instructions executable by a device to cause the device to permit the request to add the first set of freemained frames to the address space; and
    seventh instructions executable by a device to cause the device to deny the request to add the first set of freemained frames to the address space.

12. The computer program product of claim 8, wherein fourth instructions to compare the number of freemained frames to the freemained frame count target include:
    sixth instructions executable by a device to cause the device to use a set of tier descriptors to describe the comparison of the number of freemained frames to the freemained frame count target.

13. The computer program product of claim 12, wherein the set of tier descriptors includes: below; okay; high; and full.

14. The computer program product of claim 8, wherein fifth instructions to take the retention action on the address space include:
    sixth instructions executable by a device to cause the device to delete a second set of freemained frames for the address space based, at least in part, on the virtual storage address threshold.

15. A computer system comprising:
    a processor set; and
    a computer readable storage medium;

wherein:
the processor set is structured, located, connected, and/or programmed to execute instructions stored on the computer readable storage medium; and
the instructions include:
first instructions executable by a device to cause the device to receive a request to add a first set of freemained frames to an address space;
second instructions executable by a device to cause the device to determine a number of freemained frames for the address space;
third instructions executable by a device to cause the device to determine a virtual storage address threshold for the address space based, at least in part, on a freemained frame count target;
fourth instructions executable by a device to cause the device to compare the number of freemained frames to the freemained frame count target to generate a comparison; and
fifth instructions executable by a device to cause the device to take a retention action on the address space based, at least in part, on the comparison.

16. The computer system of claim 15, wherein the retention action is selected from a group consisting of:
sixth instructions executable by a device to cause the device to increase the virtual storage address threshold by a step value; and
seventh instructions executable by a device to cause the device to decrease the virtual storage address threshold by the step value.

17. The computer system of claim 16, wherein the step value is one-half of an absolute difference between the number of freemained frames and the freemained frame count target.

18. The computer system of claim 15, wherein the retention action is selected from a group consisting of:
sixth instructions executable by a device to cause the device to permit the request to add the first set of freemained frames to the address space; and
seventh instructions executable by a device to cause the device to deny the request to add the first set of freemained frames to the address space.

19. The computer system of claim 15, wherein fourth instructions to compare the number of freemained frames to the freemained frame count target include:
sixth instructions executable by a device to cause the device to use a set of tier descriptors to describe the comparison of the number of freemained frames to the freemained frame count target.

20. The computer system of claim 15, wherein fifth instructions to take the retention action on the address space include:
sixth instructions executable by a device to cause the device to delete a second set of freemained frames for the address space based, at least in part, on the virtual storage address threshold.

* * * * *